Oct. 28, 1958  R. H. CALDERWOOD  2,857,932
COMPOSITE HIGH STRENGTH TUBULAR STRUCTURE
Filed July 20, 1955
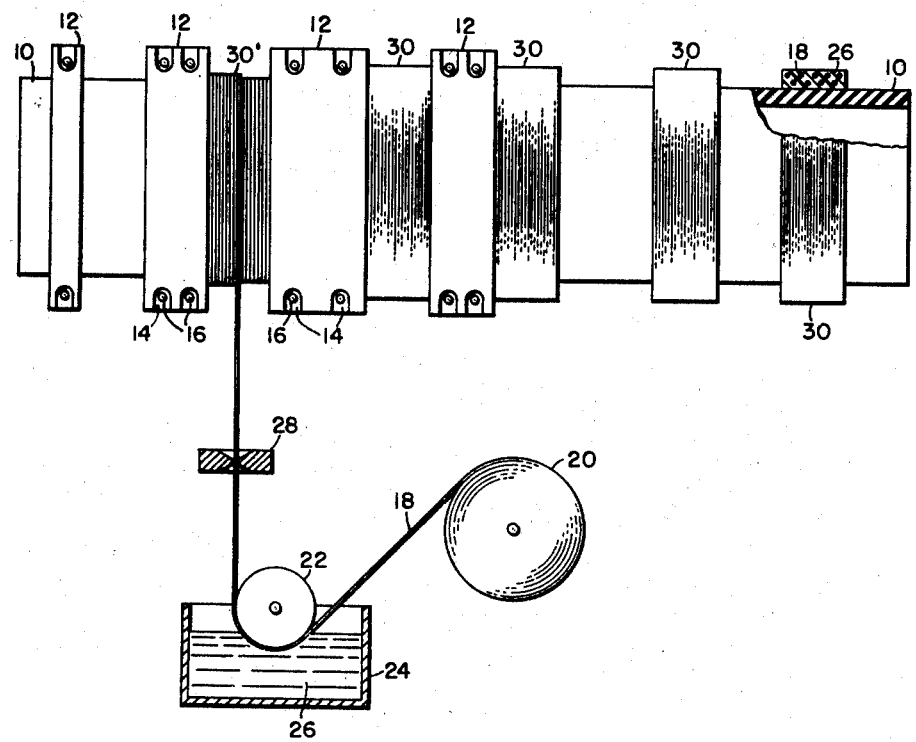
WITNESSES
INVENTOR
Robert H. Calderwood

United States Patent Office 2,857,932
Patented Oct. 28, 1958

2,857,932

COMPOSITE HIGH STRENGTH TUBULAR STRUCTURE

Robert H. Calderwood, Hampton Township, Allegheny County, Pa., assignor to Westinghouse Electric Corporation, East Pittsburgh, Pa., a corporation of Pennsylvania Application July 29, 1955, Serial No. 523,167

2 Claims. (Cl. 138—76)

This invention relates to resinous tubular bodies and more particularly to a method of applying to and bonding to resinous tubular bodies glass roving impregnated with a thermoset resin to provide strong banding members around the tubular bodies whereby composite high strength tubular members are provided.

These tubular bodies are useful in various types of insulated electrical apparatus such as circuit interrupting devices. For convenience, the application will be directed to tubular members to be employed in association or combined with circuit breakers. It is to be understood however that such tubes may be utilized for purposes other than the manufacture of circuit breakers.

Circuit breaker tubes can be economically made from cellulosic sheet material such as cotton cloth and paper impregnated with a melamine, urea or phenolic type resin. Such materials are inexpensive and since the tubes are easy to machine, the expense of machining is not great. However, these tubes do not possess great structural strength and frequently fail in use. When circuit breakers and the associated tubes are immersed in oil and the circuit breaker operated, the force generated by the current interruption is transmitted throughout the interior of the tube. Frequently, the tubes are unable to withstand the internal stresses created and cracks often develop in the walls of the tube.

Structurally strong plastic circuit breaker tubes may be made by constructing the side walls thereof of glass fabric impregnated with a thermoset resin. The use of glass fabric, however, materially increases the cost of the tubes. Additional expense is encountered if machining of the tube is required since special tools are needed for machining glass. Another expense factor is the requirement of special protective equipment because of the hazard presented by flying glass particles during the machining process.

The object of this invention is to provide for re-enforcing a resinous tubular member by applying thereto glass roving impregnated with a thermoset resin.

Another object of this invention is to provide a composite high strength tubular resinous member re-enforced by an encircling band of glass roving impregnated with a thermoset resin.

Other objects of the invention will, in part, be obvious and will, in part, appear hereinafter.

For a better understanding of the nature and objects of the invention, reference should be had to the following detailed description taken in connection with the accompanying drawing, in which:

The single figure illustrates a re-enforced tubular resinous member embodying the features of the invention and a method of preparing it in accordance with the teaching of the invention.

Briefly, in the attainment of the foregoing objects and in accordance with the present invention, there is provided a method of re-enforcing a resinous tubular member which comprises impregnating glass roving with a viscous completely reactive resin composition and wrapping the impregnated glass roving around the resinous tubular member at selected locations thereon to form superimposed layers of predetermined thickness of the roving. The resin composition is of such viscosity and has thixotropic properties such that the composition is retained in the roving after application to the resinous tubular member. The wrapped tubular member is then heated to convert the resin composition in the roving to a thermoset state whereby a strong re-enforcing member is produced to strengthen said tubular member.

Numerous thermosettable resinous compositions are available for carrying out this process. Phenolic resins, polyepoxides, melamine-aldehyde resins, furan resins and silicone resins, for example, may be employed. Exceptionally good results have been obtained with completely reactive polyester-type resinous compositions that thermoset. These completely reactive compositions may comprise one or more compounds containing two or more unsaturated aliphatic groups. Examples of such compounds are diallyl phthalate and diallyl maleate. The liquid resinous compositions to be used may comprise two or more compounds having reactive unsaturated $>C=C<$ groups capable of vinyl-type addition polymerization. Particularly good results have been secured by employing a solution comprising a liquid monomeric compound having the group $H_2C=C<$, in which is dissolved an unsaturated polyester having the group $>C=C<$. Particularly good results have been secured by employing as the polyester resin the reaction product of an ethylenic dicarboxylic acid or anhydride thereof such, for example, as maleic acid, fumaric acid, maleic anhydride, monochloromaleic acid, itaconic acid, itaconic anhydride, citraconic acid and citraconic anhydride. The unsaturated dicarboxylic acid or anhydrides or mixtures thereof are reacted with a substantially molar equivalent of one or more polyhydric alcohols such as ethylene glycol, glycerol, propylene glycol, diethylene glycol, or pentaerythritol or mixtures thereof. Castor oil has been employed successfully in an esterification reaction with maleic anhydride. The resultant ester, such as castor oil maleate ester, is admixed with a polymerizable unsaturated monomer, for example, monostyrene, in the proportions of from 10 to 85 parts by weight of the monostyrene and from 90 to 15 parts by weight of the ester.

The unsaturated alkyd esters are dissolved in a liquid unsaturated monomer having the group $H_2C=C<$. Suitable liquid unsaturated polymerizable monomers are: monostyrene, alphamethylstyrene, 2,4-dichlorostyrene, paramethyl styrene, vinyl acetate, methyl methacrylate, ethyl acrylate, diallyl phthalate, diallyl succinate, diallyl maleate, allyl alcohol, methallyl alcohol, acrylonitrile, methyl vinyl ketone, diallyl ether, vinylidene chloride, butyl methacrylate, allyl acrylate, allyl crotonate, 1,3-chloroprene, and divinyl benzene, as well as mixtures of two or more of any of these monomers.

The unsaturated esters or alkyd resins are dissolved in a monomeric compound having the group $H_2C=C<$, such as monostyrene, or a simple substitution derivative of monostyrene, or a mixture of two or more monomers, as above described, to produce low viscosity, completely reactive solutions. Particularly good results have been obtained by dissolving the unsaturated esters in monostyrene to produce solutions containing from about 20 to 70 parts by weight of monostyrene and the balance, 80 to 30 parts by weight, composed of the unsaturated esters.

The polymerizable compositions obtainable in accordance with the present invention usually cannot be stored conveniently in mixed form since polymerization generally will take place even at room temperatures within a comparatively short period of time. To overcome or substantially minimize this difficulty it is preferred to incorporate a relatively small proportion of one or more polymerization inhibitors in the mixture of resinous polyesters and reactive unsaturated monomer. Polymerization inhibitors which are suitable for use in accordance with this invention include substituted phenols and aromatic amines. More specific examples of suitable polymerization inhibitors include hydroquinone, resorcinol, tannin, sym. alpha, beta naphthyl p-phenylene diamine, and the like. The inhibitor preferably is employed in relatively small proportions. Thus, amounts less than about 1.1% may be used, with amounts as small as about 0.01% to about 0.1% generally being sufficient.

The above solutions will polymerize completely when admixed with one or more vinyl-type polymerization catalysts. Therefore, immediately prior to use, they are admixed with a catalyst, such as benzoyl peroxide, lauroyl peroxide, methyl ethyl ketone peroxide, t-butyl hydroperoxide, ascaridole, tert-butyl perbenozate, di-t-butyl diperphthalate, ozonides, and similar catalysts, in an amount of from 0.5% to 5% and more, by weight based on the total weight of the composition. The proportion of the catalyst obviously may be present in amounts differing from these percentages.

A filler such as finely divided silica in the amount of from 5 parts to 10 parts by weight is incorporated in the composition to impart the thixotropic properties required for the satisfactory operation of the invention. It has been determined that compositions having a viscosity of from 100 to 3000 poises at 25° C. gives satisfactory results. Such a viscosity is obtained when the final composition contains from 5 to 10 parts by weight of finely divided filler. Other fillers include finely divided insulating inorganic materials such as mica flakes, powdered asbestos, powdered glass and the like. These may be used to replace all or a portion of the silica.

I have found that a resin composition comprising 92½ parts by weight of the reaction product of ethylene glycol maleate and monostyrene and 7½ parts by weight of finely divided silica of an average particle size of less than one micron admixed therewith provides a suitable composition for impregnating the glass roving and one that has sufficient thixotropic properties whereby the composition is retained in the roving after application to the resinous tubular member.

To illustrate even more fully the advantages and capabilities of the present invention, the following examples are set forth. The parts given are by weight unless otherwise indicated.

*Example I*

A mixture of 1.05 mols of ethylene glycol and 1.0 mol of maleic anhydride are reacted while being sparged with carbon dioxide in a closed vessel at a temperature of 200° C. to form a polyester. Seventy parts of this polyester then are admixed thoroughly with 30 parts of monostyrene to form a resinous composition. To each 100 parts of the resulting resinous composition is added 2 parts of benzoyl peroxide. To 92½ parts of this resin composition there is added 7½ parts of finely divided silica of the size of 0.5 micron and finer. This resin composition has a vsicosity of 2000 poises at 25° C.

*Example II*

A mixture of 1.05 mols of propylene glycol and 1.0 mol of fumaric acid are reacted while being sparged with carbon dioxide in a closed vessel at a temperature of 200° C. to form a polyester. Sixty parts of this polyester then are admixed thoroughly with 40 parts of diallyl phthalate to form a resinous composition. To each 100 parts of the resulting resinous composition is added 3 parts of t-butyl hydroperoxide. To 95 parts of this resin composition is added 4 parts of silica and 1 part of mica of the size of 0.5 micron and finer. This resin composition has a viscosity of 2000 poises at 25° C.

The various features of this invention now will be described in connection with the manufacture of a reinforced tube made of cotton cloth impregnated with phenol-formaldehyde resin. Referring to the drawing, numeral 10 refers to a tube 47½ inches in length prepared by wrapping cotton cloth impregnated with phenol-formaldehyde resin about an 8-inch mandrel to form a tubular body having a wall thickness in excess of 1½ inches. The tube, after the resin had been cured to a solid, then was machined on the exterior to a wall thickness of 1½ inches.

Encircling members or spacers 12 were fitted around the exterior of the tube 10 at selected locations leaving exposed those sections of the tube to which it is desired to apply the impregnated glass roving. The spacers 12 form annular grooves with the exterior surface of the tube 10 and serve to contain the glass roving during the winding operation, thus keeping the glass roving in a compact band around the tube and preventing the glass roving from wandering up and down the tube during the winding operation. The encircling members or spacers 12 can be made of wood, metal or other suitable material. They can be held in place by any suitable means. As shown in the drawing, the spacers are split rings having slots 14 to receive suitable fastening means such as cap screws 16.

The glass roving 18 is continuously uncoiled from roll 20 and prior to its application to the selected portion of the tube 10 it is passed under roller 22 into a bath 24 containing the viscous resin composition 26 of Example 1 where it is impregnated with the resin composition.

I have found that glass roving comprising 60 continuous glass strands, each strand comprising more than 100 filaments, to be entirely satisfactory in carrying out this invention. It is obvious that glass roving having a greater or lesser diameter may be employed in this process depending on the size of the band to be produced.

After passing through the impregnating tank, the impregnated glass roving is passed through a wiping die 28 to remove excess resin composition. For satisfactorily carrying out this invention the ratio of the glass roving to the resin composition should be from 60:40 to 40:60.

The tubular member is then placed on a suitable rotating device such as a lathe and the impregnated glass roving applied to the desired portion of the tube by rotating the tube at a speed of ½ revolution per second and winding the impregnated glass roving on the tube. This winding operation is continued until the desired thickness of the glass roving has been applied to the tube and a compact encircling band member 30 is formed about the tube. Six band members are applied to the tube at selected locations in this manner. Reference numeral 30' shows a band member as it is being formed on the tube and prior to reaching the desired thickness. During the winding operation, the glass roving is preferably kept under a tension of the order of from 5 to 10 pounds. The impregnated glass roving will not be wound around the tube in a compact body if insufficient tension is applied. If too great a tension is applied, some of the resin composition will be squeezed out of the glass roving.

A fragmentary cross-sectional view of the tube of this invention is illustrated at the right end of the tube shown in the drawing. As shown in the detailed cross-sectional view, glass roving 18 impregnated with the impregnating composition 26 is wrapped around tube 10 in a plurality of layers to form band member 30.

The tube is then removed from the rotating device and subjected to heat treatment in order to cure the resinous composition to a hardened state. Such curing may be accomplished by placing the tube within an oven or otherwise heating it. I have found that placing the tube within an oven at a temperature of from 100° C. to 125° C. for a period of at least one hour is sufficient to cure the resin to a hardened state.

With some resinous compositions, the tube need only be permitted to remain at room temperature for a period of time of four to twenty-four hours, and substantially complete curing of the applied resin will take place. The curing time may be reduced considerably by the addition of a promoter such as stannous chloride, aluminum acetonyl acetonate or certain mercaptans in the amounts of from .05 to 1 part by weight.

After the resin has been cured the tube is removed from the oven, permitted to cool and the spacers removed.

During the cure, the resinous material contracts to a variable extent, depending on its composition. This contraction or shrinkage of the resin causes a tight band to be formed about the tube and sets up compressive stresses which tend to counteract any internal stresses set up in the tube.

A tube prepared as above described was assembled in association with a 300 kv. oil filled circuit breaker having a rated capacity of 46,000 amperes. The walls of this tube did not crack when the circuit breaker was subjected to a current of over 50,000 amperes. A tube similar to that described above that did not have the encircling band members applied thereto developed cracks in its wall when subjected to a current of less than 46,000 amperes.

It is to be understood that any number of band members can be placed about a tubular body by the method heretofore described. Also, one band member can be applied at a time or any number can be applied in one operation.

It is to be understood that numerous changes in the details of construction, arrangement and operation of parts, as well as composition of ingredients, may be effected without departing from the spirit of the invention.

I claim as my invention:

1. A composite high strength tubular member comprising, in combination, a tubular body comprising cellulosic sheet material impregnated and bonded with a resin binder, said tubular body being of relatively low strength, and at least one encircling band member applied to and bonded to the tubular body, said band member comprising a layer of a plurality of plies of glass fiber roving and a thermoset resin composition impregnating and uniting the plies of roving into a high strength band member, said band member comprising from 40 to 60 parts by weight of glass fiber roving and from 60 to 40 parts by weight of the thermoset resin composition, the thermoset resin composition comprising from 5 to 10 parts by weight of finely divided inorganic filler and from 95 to 90 parts by weight of resin, said resin and filler being distributed substantially uniformly throughout the interstices of the glass fiber roving.

2. A composite high strength tubular member comprising, in combination, a tubular body comprising cellulosic sheet material impregnated and bonded with a resin binder, said tubular body being of relatively low strength, and at least one encircling band member applied to and bonded to the tubular body, said band member comprising a layer of a plurality of plies of glass fiber roving and a thermoset resin composition impregnating and uniting the plies of roving into a high strength band member, said band member comprising from 40 to 60 parts by weight of glass fiber roving and from 60 to 40 parts by weight of the thermoset resin composition, the thermoset resin composition comprising from 5 to 10 parts by weight of finely divided silica of an average particle size of less than one micron, and from 95 to 90 parts by weight of the reaction product of monostyrene and glycol-maleate resin.

References Cited in the file of this patent

UNITED STATES PATENTS

| | | |
|---|---|---|
| 2,467,999 | Stephens | Apr. 9, 1949 |
| 2,552,599 | Stout | May 15, 1951 |
| 2,594,838 | Alexander et al. | Apr. 29, 1952 |
| 2,614,058 | Francis | Oct. 14, 1952 |
| 2,653,887 | Slayter | Sept. 29, 1953 |
| 2,706,497 | Shobert | Apr. 19, 1955 |
| 2,711,982 | Straka | June 28, 1955 |